United States Patent
Imada et al.

(10) Patent No.: US 6,895,313 B2
(45) Date of Patent: May 17, 2005

(54) ANGULAR VELOCITY DETECTION DEVICE

(75) Inventors: Seiji Imada, Saitama-ken (JP); Isao Endo, Saitama-ken (JP); Seiji Goto, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/771,154

(22) Filed: Feb. 4, 2004

(65) Prior Publication Data

US 2004/0204798 A1 Oct. 14, 2004

(30) Foreign Application Priority Data

Feb. 4, 2003 (JP) ........................................ 2003-067324

(51) Int. Cl.$^7$ ............................................... G05D 1/00
(52) U.S. Cl. ........................................ 701/1; 701/213
(58) Field of Search ................................ 701/1, 79, 93, 701/213

(56) References Cited

U.S. PATENT DOCUMENTS

| | | | |
|---|---|---|---|
| 5,877,677 A | * | 3/1999 | Fleming et al. ............. 340/436 |
| 5,974,359 A | | 10/1999 | Ohkubo ...................... 701/214 |
| 6,269,306 B1 | | 7/2001 | Ibrahim et al. ............. 701/214 |
| 6,498,996 B1 | | 12/2002 | Vallot ......................... 702/104 |
| 6,757,631 B2 | * | 6/2004 | Goto et al. .................. 702/104 |

FOREIGN PATENT DOCUMENTS

| EP | 0 875 731 A2 | 11/1998 |
|---|---|---|
| JP | 5-187880 | 7/1993 |

* cited by examiner

Primary Examiner—Marthe Y. Marc-Coleman
(74) Attorney, Agent, or Firm—Arent Fox

(57) ABSTRACT

An angular velocity detection device includes an angular velocity detector for delivering a first sensor output corresponding to an angular velocity of a mobile unit; a learning unit for learning a sensitivity coefficient in accordance with the first sensor output and an output provided by a GPS positioning unit; an acceleration detector for delivering a second sensor output corresponding to an acceleration of the mobile unit; a sensitivity coefficient correction unit for determining a corrected sensitivity coefficient in accordance with the sensitivity coefficient and the second sensor output; and an angular velocity converter for multiplying the first sensor output by the corrected sensitivity coefficient to thereby calculate the actual angular velocity of the mobile unit. The angular velocity detection device allows the angular velocity converter to use the corrected sensitivity coefficient to calculate each actual angular velocity of the mobile unit.

6 Claims, 7 Drawing Sheets

Prior Art

ANGULAR VELOCITY DETECTION DEVICE

BACKGROUND OF THE INVENTION

The present invention relates to an angular velocity detection device for sensing the angular velocity of a mobile unit such as a vehicle.

The present application claims priority from Japanese Patent Application No. 2003-067324, the disclosure of which is incorporated herein by reference in its entirety.

In recent years, vehicle-mounted navigation systems combine the GPS positioning using the GPS (Global Positioning System) and the autonomous navigation using an angular velocity detection device in the form of hybrid positioning so as to compensate for the drawbacks of the GPS positioning and the autonomous navigation. The navigation system then performs map matching for the resulting position information in map data, thereby determining the current location of the vehicle.

Now referring to FIG. 1, the aforementioned angular velocity detection device is designed such that the angular velocity detection device 1 is incorporated into a vehicle-mounted navigation system to detect an angular velocity $\omega_y$ of the vehicle in its traveling direction (more specifically, in the direction of yaw). An angular velocity conversion portion 3 multiplies a sensor output $\omega_{gyro}$ of an angular velocity sensor 2 (i.e., an angular velocity detected by the angular velocity sensor 2) by a sensitivity coefficient K to find the actual angular velocity $\omega_y$ of the vehicle. Then, an integrator 4 connected to the angular velocity detection device 1 integrates the angular velocity $\omega_y$ with respect to time to determine an azimuth Φ of the vehicle.

That is, suppose that the vehicle-mounted navigation system is mounted in the passenger compartment. In this case, assuming that the detection axis of the angular velocity sensor 2 is oriented in the vertical direction P (the direction of gravity) as schematically illustrated in FIG. 2A, the angular velocity sensor 2 is fixed in the vehicle-mounted navigation system.

Accordingly, the vehicle-mounted navigation system mounted in the passenger compartment under this assumption allows the angular velocity sensor 2 to have its detection axis oriented in the vertical direction P (i.e., along the normal to the horizontal plane), thereby making it possible to detect the actual angular velocity $\omega_y$ of the vehicle with high accuracy. That is, when the aforementioned assumption is satisfied such that the detection axis of the angular velocity sensor 2 is oriented in the vertical direction P, the sensor output $\omega_{gyro}$ of the angular velocity sensor 2 shown in FIG. 1 becomes a sensor output $\omega_p$ shown in FIG. 2A. The angular velocity conversion portion 3 multiplies the sensor output $\omega_{gyro}$ (i.e., $\omega_p$) by the sensitivity coefficient K, thereby allowing the actual angular velocity $\omega_y$ of the vehicle to be sensed with high accuracy.

However, vehicle-mounted navigation systems are mounted in the passenger compartment in consideration of the visibility and the operability available to the passenger, the layout of the passenger compartment and the like. Thus, in practice, many of the systems are installed, contrary to the aforementioned assumption, at a pitch angle (hereinafter referred to as the "setting angle") $\theta_{set}$ relative to the traveling direction of the vehicle.

In this case, the detection axis of the angular velocity sensor 2 is also oriented in the direction Q tilted by the setting angle $\theta_{set}$ from the vertical direction P, such that the sensor output $\omega_{gyro}$ of the angular velocity sensor 2 shown in FIG. 1 becomes a sensor output $\omega_q$ shown in FIG. 2A. This causes the aforementioned sensitivity coefficient K to have an error with respect to the sensor output $\omega_{gyro}$, so that the multiplication of the sensor output $\omega_{gyro}$ (i.e., $\omega_q$) of the angular velocity sensor by the sensitivity coefficient K would not allow the actual angular velocity $\omega_y$ of the vehicle to be detected with high accuracy.

As shown in FIG. 1, to correct the error in the sensitivity coefficient K resulting from such a setting angle $\theta_{set}$, the conventional angular velocity detection device 1 is provided with a relative orientation change calculation portion 6 for calculating a relative change in orientation $\Delta\Phi_{gyro}$ from the sensor output $\omega_{gyro}$ of the angular velocity sensor 2, a relative orientation change calculation portion 7 for calculating a relative change in orientation $\Delta\Phi_{gps}$ from the position information $\Phi_{gps}$ provided by a GPS positioning portion 5, and a learning device 8 for determining the difference ($\Delta\Phi_{gps}-\Delta\Phi_{gyro}$) between the changes in relative orientation $\Delta\Phi_{gps}$ and $\Delta\Phi_{gyro}$ and learning the sensitivity coefficient K based on the difference ($\Delta\Phi_{gps}-\Delta\Phi_{gyro}$) to thereby correct the error in the sensitivity coefficient K.

On the other hand, as schematically illustrated in FIG. 2B, suppose that the vehicle travels along an inclined road such as an uphill or downhill. In this case, the angular velocity sensor 2 is also tilted, e.g., at an angle of inclination $\theta_{inc}$ relative to the horizontal plane, causing the detection axis of the angular velocity sensor 2 to be oriented in the direction R tilted by the angle of inclination $\theta_{inc}$ relative to the vertical direction P.

Accordingly, a vehicle traveling along an inclined road would cause the sensor output $\omega_{gyro}$ of the angular velocity sensor 2 shown in FIG. 1 to become the sensor output $\omega_r$ shown in FIG. 2B, resulting in the aforementioned learned sensitivity coefficient K having an error with respect to the sensor output $\omega_{gyro}$ (i.e., $\omega_r$). Thus, the multiplication of the sensor output $\omega_{gyro}$ (i.e., $\omega_q$) of the angular velocity sensor by the sensitivity coefficient K would not allow the actual angular velocity $\omega_y$ of the vehicle to be detected with high accuracy.

Suppose also that the vehicle travels along an inclined road having the angle of inclination $\theta_{inc}$ with the angular velocity sensor 2 remaining tilted at the setting angle $\theta_{set}$. In this case, the orientation of the detection axis is tilted at a total angle ($\theta_{set}+\theta_{inc}$) of the setting angle $\theta_{set}$ and the angle of inclination $\theta_{inc}$ relative to the vertical direction P. This causes the error in the sensitivity coefficient K relative to the sensor output $\omega_{gyro}$ to become more noticeable, so that the multiplication of the sensor output $\omega_{gyro}$ of the angular velocity sensor by the sensitivity coefficient K would not allow the actual angular velocity $\omega_y$ of the vehicle to be detected with high accuracy (See Japanese Patent Application Laid-Open No. Hei 5-187880).

The aforementioned method of compensating the sensitivity coefficient K using the learning device 8 includes an error component in practice. However, while the vehicle is traveling where it can receive GPS signals coming from GPS satellites, an appropriate compensation can be made on the orientation obtained by integrating an angular velocity in accordance with the absolute orientation and positioned location provided by the GPS position information. Accordingly, the method makes it possible to maintain the actual directional accuracy of the vehicle, thereby locating the current position with accuracy.

While the vehicle is traveling where GPS signals cannot be received, it is impossible to make the compensation in accordance with the absolute orientation and the positioned location provided by the GPS position information. In this case, reference is made to a map database for map matching to make an appropriate correction, thereby allowing the accuracy of orientation to be ensured and the current position to be located with accuracy.

However, under the circumstances in which data such as the aforementioned known orientation or positioned location cannot be used, errors in the orientation obtained by integrating angular velocities are accumulated, thus resulting in a lowered degree of orientation accuracy and location accuracy of the current position.

For example, suppose that a vehicle is running in a tunnel, in an underground parking lot, or on a highway ramp, where GPS signals cannot be received. In this case, errors in the actual angular velocity $\omega_y$ of the vehicle are accumulated, thus resulting in a lowered degree of orientation accuracy and location accuracy of the current position as well.

Furthermore, suppose that a vehicle is running along an inclined road in a tunnel, on a curved highway ramp, or along a curved ascending/descending passageway provided in a spiral fashion in a multi-storied underground parking lot, etc., where GPS signals cannot be received. In this case, when the vehicle makes a turn while running along an inclined road, the error of the actual angular velocity $\omega_y$ of the vehicle is further increased, thus resulting in a lowered degree of orientation accuracy and location accuracy of the current position as well.

That is, when a vehicle makes a turn while running along an inclined road where GPS signals cannot be received, the angle of inclination $\theta_{inc}$ being varied every moment and the setting angle $\theta_{set}$ exert an effect on a sensor output $\omega_{gyro}$, which is delivered from the angular velocity sensor 2, thus causing the sensor output $\omega_{gyro}$ and a learned (corrected) sensitivity coefficient K not to be correlated with each other. This makes it difficult to sense the actual angular velocity $\omega_y$ of the vehicle with high accuracy and causes errors to be accumulated in the orientation obtained by integrating an angular velocity, resulting in a lowered degree of orientation accuracy and location accuracy of the current position.

That is, as described above, a vehicle traveling along an inclined road using the sensitivity coefficient K would cause the angular velocity sensor 2 to deliver a sensor output $\omega_{gyro}$ affected by the angle of inclination $\theta_{inc}$ being varied every moment and the setting angle $\theta_{set}$. This causes the sensitivity coefficient K to have an error with respect to the sensor output $\omega_{gyro}$. For this reason, this makes it difficult to sense the actual angular velocity $\omega_y$ of the vehicle with high accuracy even when the angular velocity conversion portion 3 multiplies the sensor output $\omega_{gyro}$ of the angular velocity sensor 2 by the sensitivity coefficient K. This also causes errors to be accumulated in the orientation obtained by integrating an angular velocity, thus resulting in a lowered degree of orientation accuracy and location accuracy of the current position.

SUMMARY OF THE INVENTION

The present invention was developed in view of the aforementioned conventional problems. It is therefore an object of the present invention to provide an angular velocity detection device which is capable of preventing degradation in detection accuracy caused by the detection axis of the angular velocity sensor being tilted thereby allowing angular velocities to be sensed with high accuracy even when data such as the known orientation or positioned location provided by the GPS cannot be used, the device being designed to improve the accuracy of the orientation obtained by integrating an angular velocity thereby determining an accurate current position.

According to a first aspect of the present invention, an angular velocity detection device, mounted in a mobile unit, for sensing an angular velocity of the mobile unit, includes: angular velocity detection means for delivering a first sensor output corresponding to an angular velocity of the mobile unit; learning means for learning a sensitivity coefficient used to convert the first senor output to an actual angular velocity of the mobile unit in accordance with the first senor output and information carried by a GPS signal; acceleration detection means for delivering a second sensor output corresponding to an acceleration of the mobile unit; sensitivity coefficient correction means for determining a corrected sensitivity coefficient in accordance with the sensitivity coefficient and the second sensor output; and angular velocity conversion means for multiplying the first sensor output by the sensitivity coefficient from the learning means or the corrected sensitivity coefficient to thereby calculate the actual angular velocity of the mobile unit. The sensitivity coefficient correction means calculates a setting angle of the angular velocity detection means relative to the mobile unit in accordance with a ratio between a sensitivity coefficient for converting a sensor output corresponding to an angular velocity sensed when a detection axis of the angular velocity detection means is oriented in a vertical direction into the actual angular velocity of the mobile unit and the sensitivity coefficient from the learning means. The sensitivity coefficient correction means also calculates an angle of inclination of the mobile unit based on a ratio of the gravitational acceleration to a difference between the second sensor output and an actual acceleration of the mobile unit. The sensitivity coefficient correction means further calculates a value obtained by multiplying a ratio between the setting angle and the angle of inclination by the sensitivity coefficient from the learning means as the corrected sensitivity coefficient. The sensitivity coefficient correction means then allows the angular velocity conversion means to calculate the actual angular velocity of the mobile unit using the corrected sensitivity coefficient.

According to a second aspect of the present invention, an angular velocity detection device, mounted in a mobile unit, for sensing an angular velocity of the mobile unit, includes: angular velocity detection means for delivering a first sensor output corresponding to an angular velocity of the mobile unit; learning means for learning a sensitivity coefficient used to convert the first senor output to an actual angular velocity of the mobile unit in accordance with the first senor output and information carried by a GPS signal; acceleration detection means for delivering a second sensor output corresponding to an acceleration of the mobile unit; sensitivity coefficient correction means for determining a corrected sensitivity coefficient in accordance with the second sensor output; and angular velocity conversion means for multiplying the first sensor output by the sensitivity coefficient from the learning means or the corrected sensitivity coefficient to thereby calculate the actual angular velocity of the mobile unit. The sensitivity coefficient correction means learns the second sensor output to thereby determine a middle learning value from the acceleration detection means. The sensitivity coefficient correction means also calculates a setting angle of the angular velocity detection means relative to the mobile unit in accordance with a value obtained by multiplying a difference between the middle learning value and an under-horizontal middle learning value by the second sensor output divided by the gravitational acceleration, the under-horizontal middle learning value being obtained by learning a sensor output corresponding to an acceleration sensed when a detection axis of the acceleration detection means is oriented in a horizontal direction. The sensitivity coefficient correction means further calculates an angle of inclination of the mobile unit based on a ratio of the gravitational acceleration to a difference between the second sensor output and an actual acceleration of the mobile unit. The sensitivity coefficient correction means also calculates a value obtained by multiplying a ratio between the setting angle and the angle of inclination by the sensitivity coefficient from the learning means as the corrected sensitivity coefficient. The sensitivity coefficient correction means then allows the angular velocity conversion means to calculate the actual angular velocity of the mobile unit using the corrected sensitivity coefficient.

According to a third aspect of the present invention, an angular velocity detection device, mounted in a mobile unit, for sensing an angular velocity of the mobile unit includes: angular velocity detection means for delivering a first sensor output corresponding to an angular velocity of the mobile unit; learning means for learning a sensitivity coefficient used to convert the first senor output to an actual angular velocity of the mobile unit in accordance with the first senor output and information carried by a GPS signal; acceleration detection means for delivering a second sensor output corresponding to an acceleration of the mobile unit; sensitivity coefficient correction means for determining a corrected sensitivity coefficient in accordance with the sensitivity coefficient and the second sensor output; and angular velocity conversion means for multiplying the first sensor output by the sensitivity coefficient from the learning means or the corrected sensitivity coefficient to thereby calculate the actual angular velocity of the mobile unit. The sensitivity coefficient correction means calculates a first setting angle of the angular velocity detection means relative to the mobile unit in accordance with a ratio between a sensitivity coefficient for converting a sensor output corresponding to an acceleration sensed when the detection axis of the angular velocity detection means is oriented in a vertical direction into the actual angular velocity of the mobile unit and the sensitivity coefficient from the learning means. The sensitivity coefficient correction means learns the second sensor output to thereby determine a middle learning value from the acceleration detection means. The sensitivity coefficient correction means also calculates a second setting angle of the angular velocity detection means relative to the mobile unit in accordance with a value obtained by multiplying a difference between the middle learning value and an under-horizontal middle learning value by the second sensor output divided by the gravitational acceleration, the under-horizontal middle learning value being obtained by learning a sensor output corresponding to an acceleration sensed when a detection axis of the acceleration detection means is oriented in a horizontal direction. The sensitivity coefficient correction means further calculates an angle of inclination of the mobile unit based on a ratio of the gravitational acceleration to a difference between the second sensor output and an actual acceleration of the mobile unit. The sensitivity coefficient correction means selects one of the first and second setting angles in accordance with a predetermined condition to calculate, as the corrected sensitivity coefficient, a value obtained by multiplying a ratio between the selected setting angle and the angle of inclination by the sensitivity coefficient from the learning means. The sensitivity coefficient correction means then allows the angular velocity conversion means to calculate the actual angular velocity of the mobile unit using the corrected sensitivity coefficient.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Now, as a preferred embodiment according to the present invention, an angular velocity detection device which is incorporated, for example, into a vehicle-mounted navigation system will be described below.

[First Embodiment]

An angular velocity detection device according to the first embodiment is explained with reference to FIGS. 3 and 4.

Figure 3:
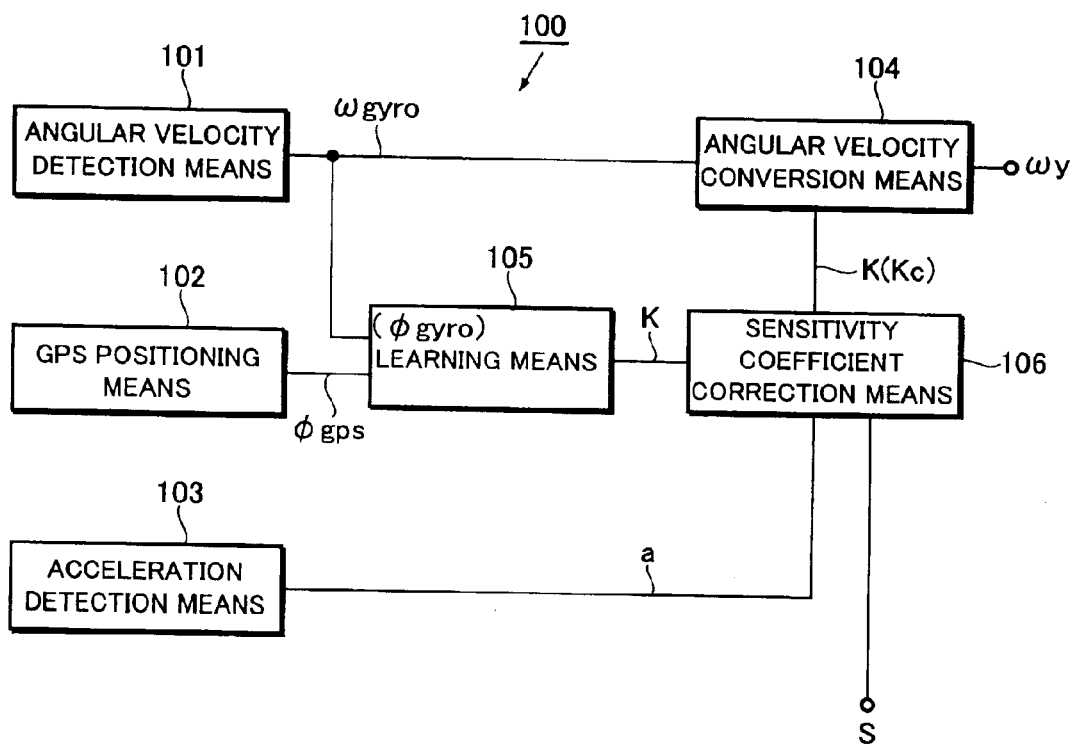
FIG. 3 is a block diagram illustrating the configuration of an angular velocity detection device according to first and second embodiments.

FIG. 3 is a block diagram illustrating the configuration of the angular velocity detection device according to this embodiment.

Referring to FIG. 3, the angular velocity detection device 100 includes angular velocity detection means 101, GPS positioning means 102, acceleration detection means 103, angular velocity conversion means 104, learning means 105, and sensitivity coefficient correction means 106.

The angular velocity detection means 101 has an angular velocity sensor (gyro sensor) for sensing the angular velocity of a vehicle serving as a mobile unit in the direction of yaw. When the vehicle-mounted navigation system is installed in the passenger compartment of a vehicle maintained horizontally according to the pre-conditions determined at the time of design, the detection axis of the angular velocity sensor is oriented in the vertical direction. The angular velocity detection means 101 delivers the sensor output $\omega_{gyro}$ detected by the aforementioned angular velocity sensor.

The GPS positioning means 102 receives GPS signals coming from GPS satellites to locate the current position of the vehicle and calculate a relative change in orientation $\Delta\Phi_{gps}$ for output.

As used herein, the relative change in orientation refers to a relative change in azimuth $\Phi_{y2}$ at position $Y_2$ with respect to azimuth $\Phi_{y1}$ at position $Y_1$ when the vehicle has traveled from the position $Y_1$ to the position $Y_2$ in unit time T.

The acceleration detection means 103 has an acceleration sensor for sensing the acceleration of a traveling vehicle, and outputs sensor output "a" delivered by the acceleration sensor.

The angular velocity conversion means 104 multiplies the sensor output $\omega_{gyro}$ delivered from the angular velocity detection means 101 by a sensitivity coefficient K, discussed later, or a corrected sensitivity coefficient $K_c$, thereby determining the actual angular velocity $\omega_y$ of the vehicle for output.

The learning means 105 calculates a change per unit time T in the sensor output $\omega_{gyro}$ delivered by the angular velocity detection means 101 to determine a relative change in orientation $\Delta\Phi_{gyro}$ of the vehicle. The learning means 105 also learns the sensitivity coefficient K for converting the sensor output $\omega_{gyro}$ into the actual angular velocity $\omega_y$ of the vehicle in accordance with the difference ($\Delta\Phi_{gyro}-\Delta\Phi_{gps}$) between the relative change in orientation $\Delta\Phi_{gyro}$ and the relative change in orientation $\Delta\Phi_{gps}$ delivered by the GPS positioning means 102.

When the GPS positioning means 102 can receive GPS signals, the sensitivity coefficient correction means 106 supplies the sensitivity coefficient K the learning means 105 has learned to the angular velocity conversion means 104, which in turn calculates the actual angular velocity $\omega_y$ of the vehicle as in the following equation (1). That is, $$\omega_y = K \times \omega_{gyro} \tag{1}$$

On the other hand, for example, when a vehicle is traveling in a tunnel or in an underground parking lot with the GPS positioning means 102 being unable to receive GPS signals, the sensitivity coefficient correction means 106 performs correction processing on the sensitivity coefficient K the learning means 105 has learned, and then supplies the resulting corrected sensitivity coefficient Kc to the angular velocity conversion means 104, which in turn calculates the actual angular velocity $\omega_y$ of the vehicle as in the following equation (2). That is, $$\omega_y = Kc \times \omega_{gyro} \tag{2}$$

Now, the processing performed for the aforementioned correction will be described which is made in the sensitivity coefficient correction means 106. The sensitivity coefficient correction means 106 starts the correction processing to supply corrected sensitivity coefficients Kc calculated successively to the angular velocity conversion means 104.

Once having started the correction processing, the sensitivity coefficient correction means 106 performs a calculation as in the following equation (3), thereby determining the setting angle $\theta_{set}$ of the angular velocity detection means 101. That is, $$\theta_{set} = \cos^{-1}(K_0/K) \tag{3}$$

Figure 1:
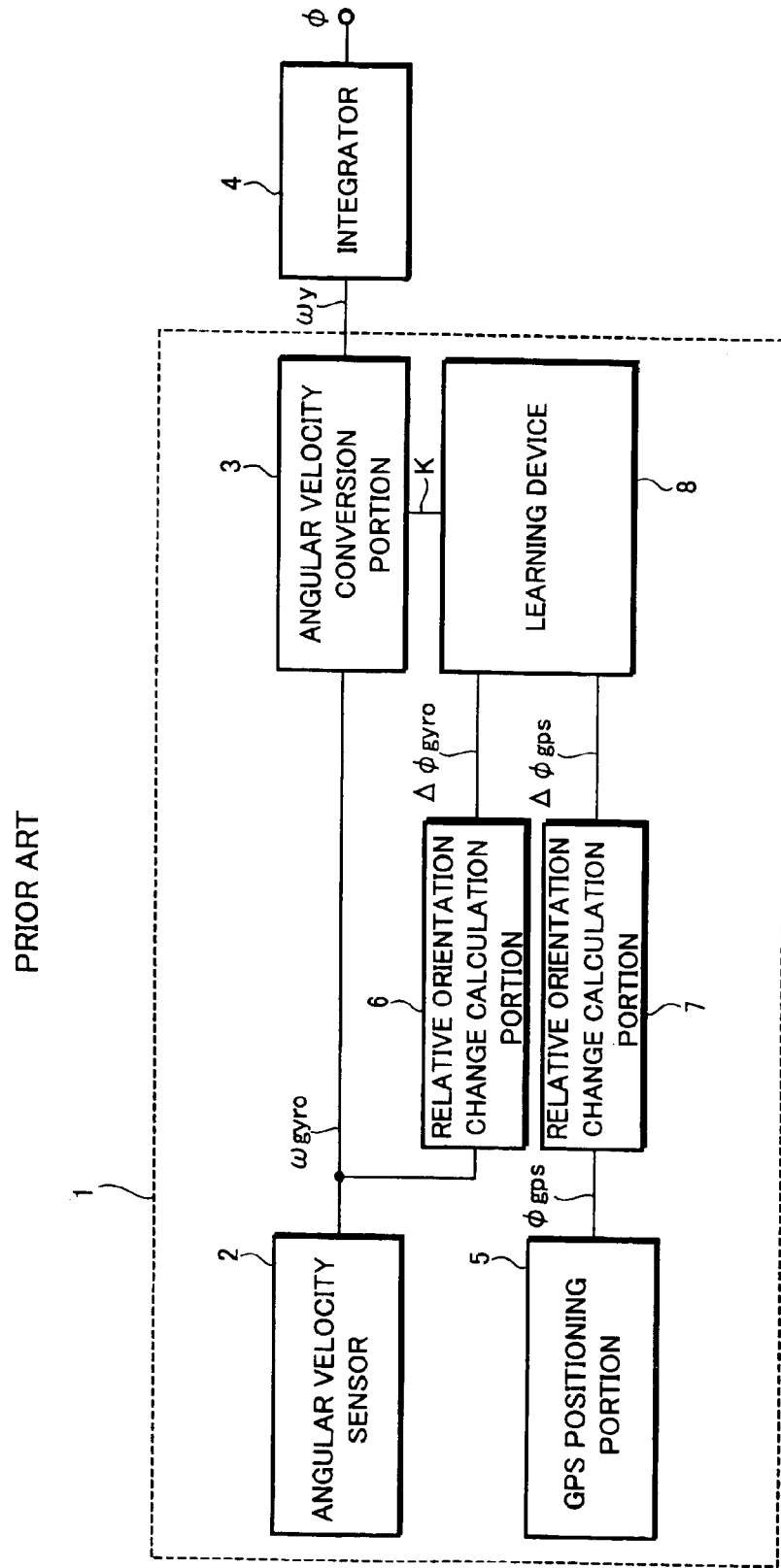
FIG. 1 is a block diagram illustrating the configuration of a conventional angular velocity detection device.
Figure 2:
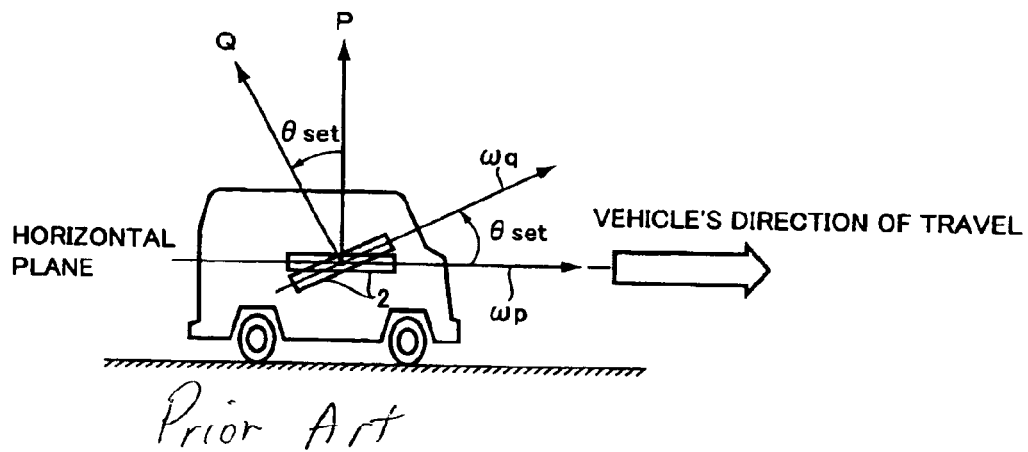
FIGS. 2A and 2B are explanatory views illustrating the function of the conventional angular velocity detection device.
Figure 2:
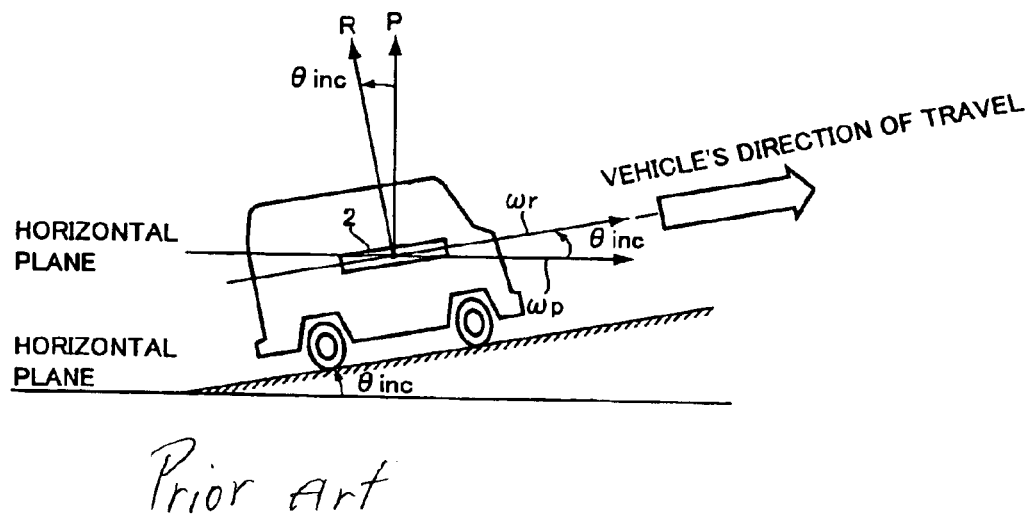

That is, as described with reference to FIG. 2A, it is qualitatively determined in accordance with the aforementioned equation (3) whether the vehicle-mounted navigation system installed at the setting angle $\theta_{set}$ in the passenger compartment, contrary to the predetermined assumption, causes the orientation of the detection axis of the angular velocity sensor provided in the angular velocity detection means 101 to be tilted by the setting angle $\theta_{set}$ from the vertical direction P.

In the foregoing, the sensitivity coefficient $K_0$ in the aforementioned equation (3) is an ideal sensitivity coefficient available when the vehicle-mounted navigation system is installed in the passenger compartment based on the assumption with the vehicle being maintained horizontally. In other words, the sensitivity coefficient $K_0$ is a sensitivity coefficient available when the detection axis of the angular velocity sensor provided in the angular velocity detection means 101 is oriented in the vertical direction P, the sensitivity coefficient being already known in advance at the stage of design in accordance with the specification or the like specifying the characteristics of the angular velocity sensor.

Thus, data on the sensitivity coefficient $K_0$ is pre-stored in the sensitivity coefficient correction means 106 prior to the shipment of the vehicle-mounted navigation system as a completed product. The sensitivity coefficient correction means 106 uses the data on the sensitivity coefficient $K_0$ to perform a calculation as in the aforementioned equation (3).

On the other hand, at the aforementioned stage of design, experiments may also be carried out to actually measure the characteristics of the angular velocity sensor and store the resulting experimental data on the sensitivity coefficient $K_0$ in advance in the sensitivity coefficient correction means 106.

Furthermore, the aforementioned converged sensitivity coefficient K and the sensitivity coefficient $K_0$ has the relation as represented by the following equation (4). That is, $$K = K_0/\cos\theta_{set} \tag{4}$$

In other words, as described with reference to FIG. 2A, when the detection axis of the angular velocity sensor provided in the angular velocity detection means 101 is oriented in the same direction as the direction Q tilted by the setting angle $\theta_{set}$ relative to the vertical direction P, the sensor output $\omega_{gyro}$ of the angular velocity sensor becomes $\omega_q$.

The learning means 105 performs the aforementioned learning in accordance with the difference ($\Delta\Phi_{gyro}-\Delta\Phi_{gps}$) between the relative change in orientation $\Delta\Phi_{gyro}$ determined from the sensor output $\omega_{gyro}$ (i.e., $\omega_q$) and the relative change in orientation $\Delta\Phi_{gps}$ delivered by the GPS positioning means 102, and then operates to determine the sensitivity coefficient K.

As expressed by the aforementioned equation (3), the sensitivity coefficient correction means 106 calculates an inverse triangular function $\cos^{-1}(K_0/K)$ of the ratio $(K_0/K)$ between the sensitivity coefficients K and $K_0$, thereby determining the setting angle $\theta_{set}$.

Furthermore, the sensitivity coefficient correction means 106 uses the sensor output "a" supplied by the acceleration detection means 103 and a vehicle speed pulse "S" delivered by a vehicle speed sensor (not shown) provided in the vehicle to calculate the angle of inclination $\theta_{inc}$ of an inclined road along which the vehicle is traveling.

Figure 4:
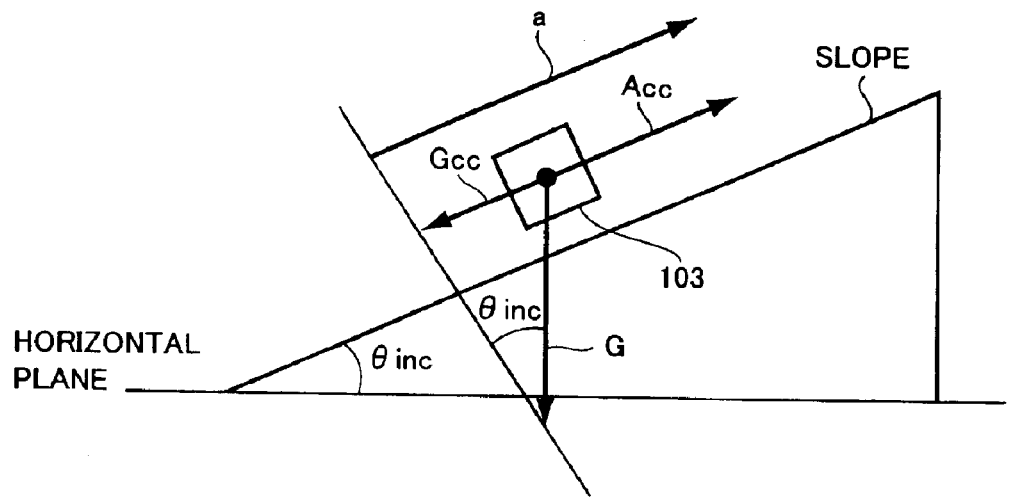
FIG. 4 is an explanatory view illustrating the principle of calculating an angle of inclination in the angular velocity detection device according to the first embodiment.

FIG. 4 is a view illustrating the calculation principle of the angle of inclination $\theta_{inc}$.

Referring to FIG. 4, suppose that the vehicle travels along an inclined road such as an uphill having an angle of inclination θinc. In this case, the sensor output "a" of the acceleration sensor provided in the acceleration detection means 103 delivers the sum ($G_{cc}+A_{cc}$) of an acceleration $G_{cc}$ produced by the gravitational acceleration "G" and the actual acceleration $A_{cc}$ of the vehicle.

The acceleration $G_{cc}$ is produced according to the relation expressed by the following equation (5). Assuming that the angle of inclination $\theta_{inc}$ of an uphill lies within a range from 0° to 90° and the angle of inclination $\theta_{inc}$ of a downhill lies within a range from 0° to -90°, the acceleration $G_{cc}$ takes on a negative value when the vehicle is traveling along an uphill whereas the acceleration $G_{cc}$ takes on a positive value when the vehicle is traveling along a downhill.

$$G_{cc} = G \times \sin\theta_{inc} \tag{5}$$

Accordingly, the aforementioned sensor output "a" of the acceleration sensor, expressed by the following equation (6), is different from the actual acceleration $A_{cc}$ of the vehicle. That is, $$a = G_{cc} + A_{cc} = G \times \sin\theta_{inc} + A_{cc} \tag{6}$$

In this context, the sensitivity coefficient correction means 106 determines the vehicle velocity "V" from the vehicle speed pulse "S" corresponding to the rotational angle per predetermined unit time of a vehicle wheel to differentiate the velocity "V" with respect to time, thereby providing an estimate of the aforementioned actual acceleration $A_{cc}$ of the vehicle.

The aforementioned estimated acceleration $A_{cc}$ is applied to the following equation (7) that is obtained by modifying the aforementioned equation (6). Thus, a sinusoidal value (sin $\theta_{inc}$) or $(a-A_{cc})/G$ is calculated and a $\sin^{-1}\{(a-A_{cc})/G\}$ of the following equation (8) is then calculated to thereby determine the angle of inclination $\theta_{inc}$.

$$\sin \theta_{inc} = (a-A_{cc})/G \quad (7)$$

$$\theta_{inc} = \sin^{-1}\{(a-A_{cc})/G\} \quad (8)$$

Subsequently, the setting angle $\theta_{set}$ and the angle of inclination $\theta_{inc}$ determined by the aforementioned equations (3) and (8) are applied to the following equation (9) to determine the corrected sensitivity coefficient $K_c$.

$$K_c = \{\cos \theta_{set}/\cos(\theta_{set}-\theta_{inc})\} \times K \quad (9)$$

The aforementioned equation (9) is determined as follows.

First, the relation between the sensitivity coefficients K and $K_0$ is as described with reference to the aforementioned equation (4). On the other hand, for the angular velocity conversion means 104 to determine the actual angular velocity $\omega_y$ of the vehicle with high accuracy when the vehicle having a vehicle-mounted navigation system installed at the setting angle $\theta_{set}$ therein is traveling along an inclined road having an angle of inclination $\theta_{inc}$, the corrected sensitivity coefficient $K_c$ needs to satisfy the condition given by the following equation (10).

That is, the inclination of the angular velocity sensor provided in the angular velocity detection means 101 relative to the horizontal plane is the difference $(\theta_{set}-\theta_{inc})$ between the setting angle $\theta_{set}$ and the angle of inclination $\theta_{inc}$. Upon occurrence of this difference $(\theta_{set}-\theta_{inc})$, the aforementioned equation (4) becomes the following equation (10).

$$K_c = K_0/\cos(\theta_{set}-\theta_{inc}) \quad (10)$$

The aforementioned equations (4) and (10) are then combined to derive the relation between the corrected sensitivity coefficient $K_c$ and the sensitivity coefficient K as in the aforementioned equation (9).

Applying the setting angle $\theta_{set}$ and the angle of inclination $\theta_{inc}$ in this manner to the aforementioned equation (9) allows an appropriately corrected sensitivity coefficient $K_c$ to be determined. Furthermore, the angular velocity conversion means 104 multiplies the sensor output $\omega_{gyro}$ delivered from the angular velocity detection means 101 by the corrected sensitivity coefficient $K_c$, thereby making it possible to determine the actual angular velocity $\omega_y$ of the vehicle with high accuracy.

As described above, according to the angular velocity detection device 100 of this embodiment, the learning means 105 learns the sensitivity coefficient K and the sensitivity coefficient correction means 106 starts the correction processing to determine the corrected sensitivity coefficient $K_c$ based on the sensitivity coefficient K the learning means 105 has learned. Therefore, it is possible to quickly determine the corrected sensitivity coefficient $K_c$ suitable for detecting the actual angular velocity $\omega_y$ of the vehicle with high accuracy.

For this reason, the angular velocity detection device 100 according to this embodiment can accurately calculate the angular velocity $\omega_y$ without using the known orientation or the like provided by the GPS. This allows the orientation obtained by integrating an angular velocity to be calculated with high accuracy, thereby realizing a continuous navigation.

The aforementioned angular velocity detection device 100 according to the first embodiment continues to determine the corrected sensitivity coefficient $K_c$ generated by the sensitivity coefficient correction means 106 in accordance with the sensitivity coefficient K the learning means 105 has learned. Therefore, multiplying the sensor output $\omega_{gyro}$ from the angular velocity detection means 101 by the corrected sensitivity coefficient $K_c$ allows the actual angular velocity $\omega_y$ of the vehicle to be determined.

[Second Embodiment]

Now, an angular velocity detection device according to a second embodiment will be described below. The angular velocity detection device according to this embodiment has basically the same configuration as that shown in FIG. 3, so the configuration of the angular velocity detection device according to this embodiment will also be explained with reference to FIG. 3.

Referring to FIG. 3, the difference between the angular velocity detection device 100 according to this embodiment and the first embodiment is as follows. That is, in the angular velocity detection device 100 according to this embodiment, the sensitivity coefficient correction means 106 does not determine the setting angle $\theta_{set}$ in accordance with the sensitivity coefficient K the learning means 105 has learned but uses the sensor output "a" delivered from the acceleration sensor provided in the acceleration detection means 103 to determine the setting angle $\theta_{set}$. The remaining angular velocity detection means 101, GPS positioning means 102, acceleration detection means 103, angular velocity conversion means 104, and learning means 105 have the same configuration as that of the first embodiment.

Accordingly, the difference between the sensitivity coefficient correction means 106 of this embodiment and that of the first embodiment will be mainly stated, thereby describing below the angular velocity detection device 100 according to this embodiment.

First, the sensitivity coefficient correction means 106 employs not the correction processing described with reference to the aforementioned equations (3) and (4), i.e., the technique for using the sensitivity coefficient K the learning means 105 has learned to determine the setting angle $\theta_{set}$, but employs another technique to be discussed below to determine the setting angle $\theta_{set}$.

First, the sensitivity coefficient correction means 106 learns the sensor output "a" delivered from the acceleration sensor provided in the acceleration detection means 103, thereby determining a middle learning value "M" of the acceleration sensor. In other words, the sensitivity coefficient correction means 106 learns the sensor outputs "a" successively delivered to determine a value provided when the learned results converge as the middle learning value "M".

A calculation is performed as in the following equation (11) to determine a sine (sin $\theta_{set}$) with respect to the setting angle $\theta_{set}$ and then the inverse triangular function of the following equation (12) is calculated, thereby determining the setting angle $\theta_{set}$.

$$\sin \theta_{set} = (M-M_0) \times \alpha/G \quad (11)$$

$$\theta_{set} = \sin^{-1}\{(M-M_0) \times \alpha/G\} \quad (12)$$

The coefficient $\alpha$ is the sensitivity coefficient of the acceleration sensor, and G is the gravitational acceleration, which are pre-stored in the sensitivity coefficient correction means 106.

The coefficient $M_0$ is the middle learning value (also referred to as the under-horizontal middle learning value) that is obtained by learning the sensor output "a" delivered by the acceleration sensor when the detection axis of the acceleration sensor is maintained in parallel to the horizontal plane. The under-horizontal middle learning value $M_0$ is also a known value provided in a specification or the like specifying the characteristics of the acceleration sensor.

Thus, data on the under-horizontal middle learning value $M_0$ is pre-stored at the stage of design in the sensitivity coefficient correction means 106 in conjunction with data on the gravitational acceleration "G" and data on the gain a of the acceleration sensor. The sensitivity coefficient correction means 106 applies the under-horizontal middle learning value $M_0$, the gravitational acceleration "G", and the gain α in conjunction with the middle learning value "M" to the aforementioned equations (11) and (12) to thereby determine the setting angle $\theta_{set}$.

Figure 5:
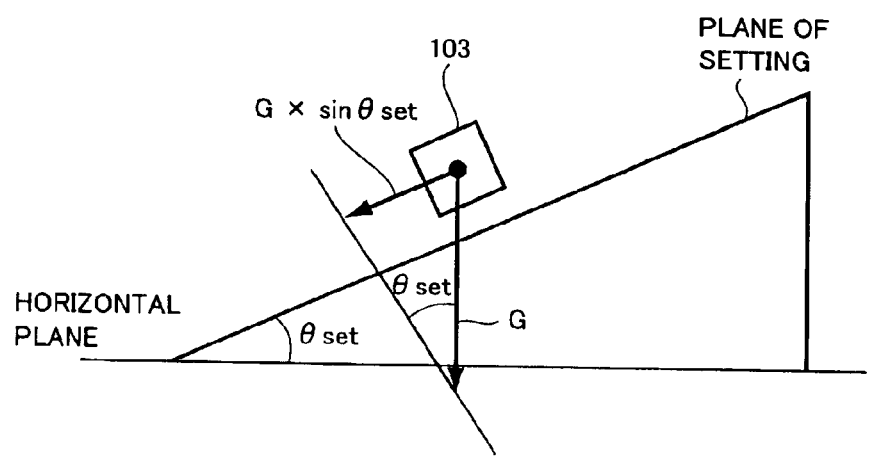
FIG. 5 is an explanatory view illustrating the principle of calculating a setting angle in the angular velocity detection device according to the second embodiment.

Furthermore, the principle of calculating the setting angle $\theta_{set}$ is explained below with reference to FIG. 5.

The acceleration detection means 103 being installed in the passenger compartment at an inclination of the setting angle $\theta_{set}$ relative to the horizontal plane will cause the orientation of the detection axis of the acceleration sensor provided in the acceleration detection means 103 to be tilted by the setting angle $\theta_{set}$.

This causes the sensor output "a" of the acceleration sensor to be affected by a component (G×sin $\theta_{set}$) of the gravitational acceleration "G".

Suppose that the aforementioned sensor output "a" is learned to thereby determine the middle learning value "M" and then a value {(M−$M_0$)×α} obtained by multiplying the difference (M−$M_0$) between the middle learning value "M" and the under-horizontal middle learning value $M_0$ by gain α. In this case, as expressed by the following equation (13), the value {(M−$M_0$)×α} is a value corresponding to the aforementioned component (G×sin $\theta_{set}$) of the gravitational acceleration "G".

$$G \times \sin \theta_{set} = (M - M_0) \times \alpha \quad (13)$$

Therefore, in accordance with the aforementioned equations (11) and (12) that are obtained by modifying the equation (13), the sensitivity coefficient correction means 106 performs a calculation to thereby obtain the setting angle $\theta_{set}$.

Then, the sensitivity coefficient correction means 106 performs the correction processing described with reference to the aforementioned equations (5) to (8) to thereby derive the angle of inclination $\theta_{inc}$ using the sensor output "a" delivered from the acceleration detection means 103 and the vehicle speed pulse "S".

The angle of inclination $\theta_{inc}$ and the aforementioned setting angle $\theta_{set}$ are applied to the aforementioned equation (9) to thereby derive an appropriately corrected sensitivity coefficient $K_c$, which is in turn supplied to the angular velocity conversion means 104 to multiply the sensor output $\omega_{gyro}$ delivered from the angular velocity detection means 101 by the corrected sensitivity coefficient $K_c$. This makes it possible to detect the actual angular velocity $\omega_y$ of the vehicle with high accuracy.

As described above, unlike in the first embodiment, the angular velocity detection device 100 according to this embodiment uses the sensor output "a" delivered from the acceleration detection means 103 to calculate the setting angle $\theta_{set}$.

That is, since the sensitivity coefficient correction means 106 uses the sensor output "a" delivered from the acceleration detection means 103 to calculate the setting angle $\theta_{set}$, the actual angular velocity $\omega_y$ of the vehicle can be sensed with high accuracy.

For this reason, the angular velocity detection device 100 according to this embodiment can accurately calculate the angular velocity $\omega_y$ without using the known orientation or the like provided by the GPS. This allows the orientation obtained by integrating an angular velocity to be calculated with high accuracy, thereby realizing a continuous navigation.

EXAMPLE

Figure 6:
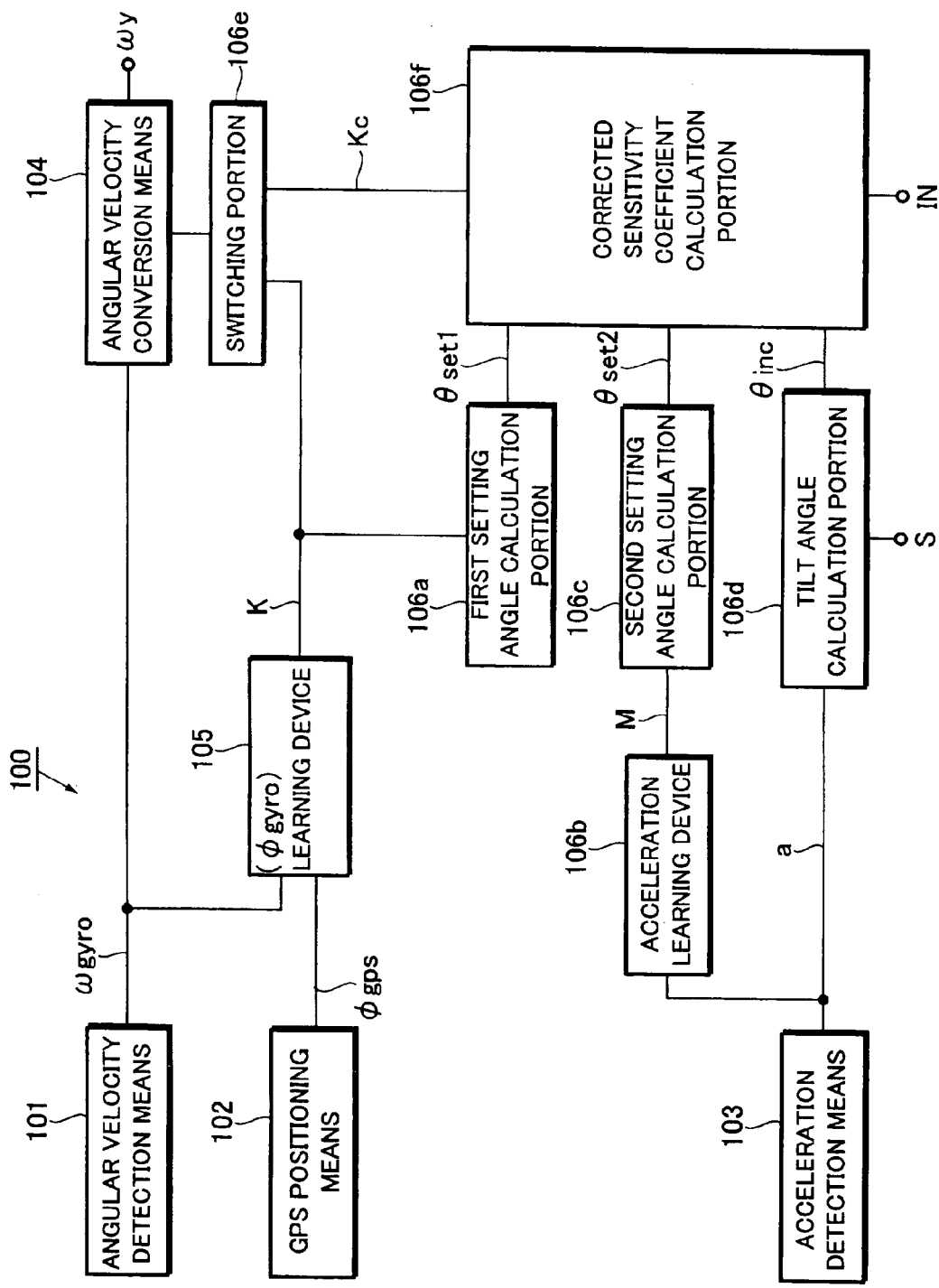
FIG. 6 is a block diagram illustrating the configuration of an angular velocity detection device according to an example.
Figure 7:
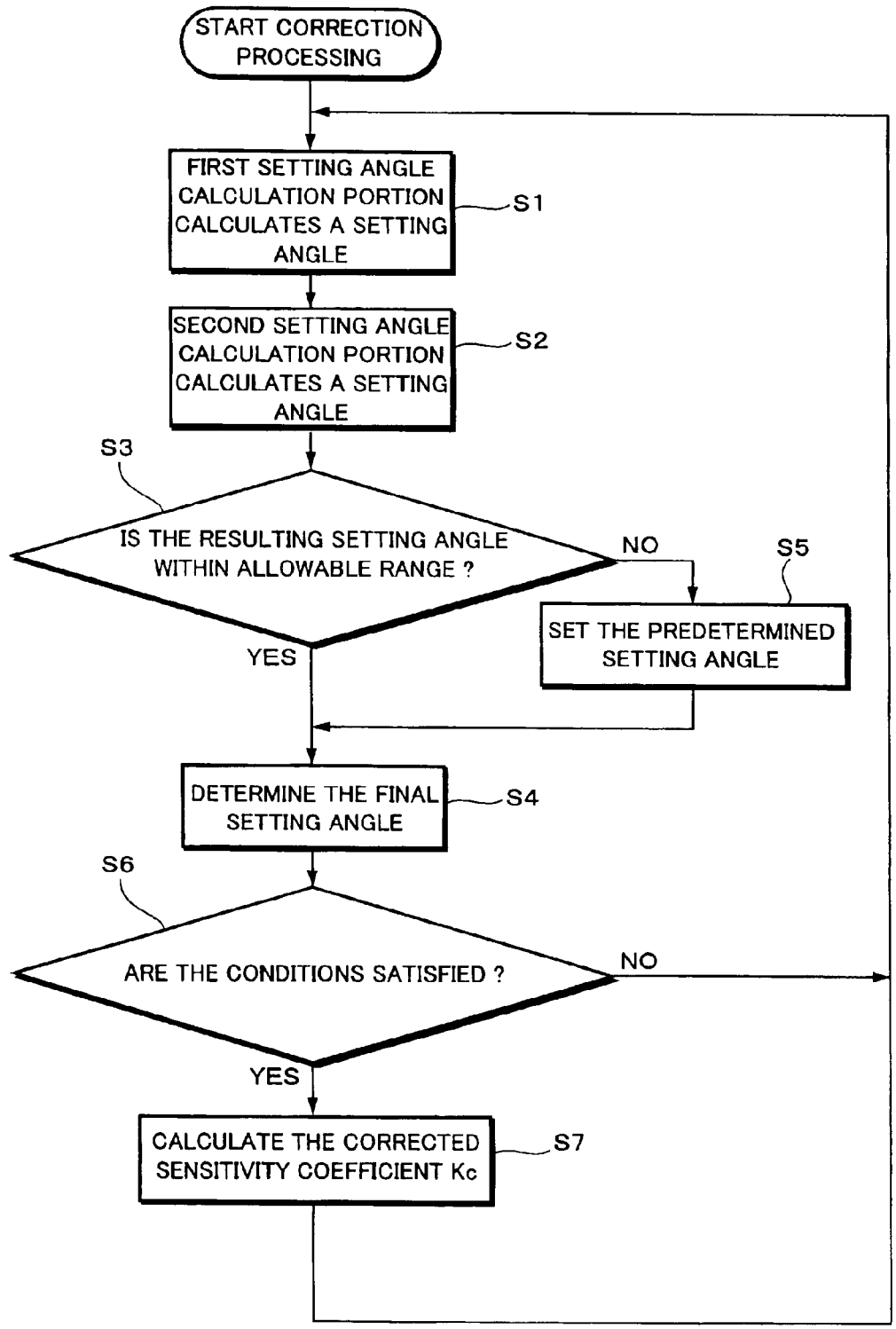
FIG. 7 is an explanatory flowchart showing an exemplary operation of the angular velocity detection device according to the example.

Now, a more specific example will be described below with reference to FIGS. 6 and 7. FIG. 6 is a block diagram illustrating the configuration of the angular velocity detection device 100 according to this example, FIG. 7 being an explanatory flowchart showing the operation of the angular velocity detection device 100 according to this example.

In FIG. 6, the like or equivalent components to those of the angular velocity detection device 100 according to the first and second embodiments shown in FIG. 3 are indicated by the like reference symbols.

Referring to FIG. 6, the angular velocity detection device 100 includes an angular velocity detection portion 101, a GPS positioning portion 102, an acceleration detection portion 103, an angular velocity conversion portion 104, and a calculator 105, which correspond to the angular velocity detection means 101, the GPS positioning means 102, the acceleration detection means 103, the angular velocity conversion means 104, and the learning means 105, respectively, shown in FIG. 3.

Additionally, the portion corresponding to the sensitivity coefficient correction means 106 shown in FIG. 3 includes a first setting angle calculation portion 106a, an acceleration learning device 106b, a second setting angle calculation portion 106c, a tilt angle calculation portion 106d, a switching portion 106e, and a corrected sensitivity coefficient calculation portion 106f.

A microprocessor (MPU) provided in the angular velocity detection device 100 executes predetermined object programs to implement the aforementioned learning device 105, the angular velocity conversion portion 104, the first setting angle calculation portion 106a, the acceleration learning device 106b, the second setting angle calculation portion 106c, the tilt angle calculation portion 106d, the switching portion 106e, and the corrected sensitivity coefficient calculation portion 106f.

Furthermore, like in the first embodiment described with reference to the aforementioned equation (3), the first setting angle calculation portion 106a calculates a setting angle $\theta_{set1}$ in accordance with the sensitivity coefficient K of the learning device 105 and then supplies it to the corrected sensitivity coefficient calculation portion 106f.

Like in the second embodiment described with reference to the aforementioned equations (11) to (13), the acceleration learning device 106b learns the sensor output "a" delivered from the acceleration sensor provided in the acceleration detection portion 103, thereby determining the middle learning value "M" for output.

Like in the second embodiment described with reference to the aforementioned equation (12), the second setting angle calculation portion 106c performs calculations using the middle learning value "M" to thereby determine a setting angle $\theta_{set2}$, which is in turn supplied to the corrected sensitivity coefficient calculation portion 106f.

Like in the first embodiment described with reference to the aforementioned equation (8), the tilt angle calculation portion 106d calculates the angle of inclination $\theta_{inc}$ in accordance with the sensor output "a" delivered from the acceleration detection means 103 and the vehicle speed pulse "S", and then supplies it to the corrected sensitivity coefficient calculation portion 106f.

The corrected sensitivity coefficient calculation portion 106f applies, to the aforementioned equation (9), the setting angles $\theta_{set1}$, $\theta_{set2}$ supplied from the first and second setting angle calculation portions 106a, 106c and the angle of inclination $\theta_{inc}$ supplied from the tilt angle calculation portion 106d to thereby calculate the corrected sensitivity coefficient Kc, which is in turn supplied to the switching portion 106e.

The switching portion 106e, which serves to determine whether the resulting corrected sensitivity coefficient $K_c$ is reliable, determines which to use the sensitivity coefficient K delivered from the learning device 105 or the corrected sensitivity coefficient Kc, and then supplies the resulting coefficient to the angular velocity conversion means 104.

In addition, the corrected sensitivity coefficient calculation portion 106f is designed to perform processing in accordance with an instruction IN provided by a user or the like when the user or the like operates on an operator panel (not shown) provided in the vehicle-mounted navigation system.

Now, an exemplary operation of the angular velocity detection device 100 according to this embodiment will be described with reference to the flowchart of FIG. 7.

When the vehicle is traveling where the GPS positioning means 102 can receive GPS signals, the learning device 105 learns the sensitivity coefficient K. The acceleration learning device 106b learns the sensor output "a" delivered from the acceleration detection means 103 to output the middle learning value "M".

The switching portion 106e connects between the corrected sensitivity coefficient calculation portion 106f and the angular velocity conversion portion 104, while blocking between a learning portion 106b and the angular velocity conversion portion 104. Furthermore, the first setting angle calculation portion 106a, the second setting angle calculation portion 106c, the tilt angle calculation portion 106d, and the corrected sensitivity coefficient calculation portion 106f start to perform correction processing.

Once the correction processing starts in this manner, in step S1, the first setting angle calculation portion 106a receives the sensitivity coefficient K delivered from the learning device 105 to perform the calculation defined by the aforementioned equation (3), thereby determining the setting angle $\theta_{set1}$.

Then, in step S2, the second setting angle calculation portion 106c uses the middle learning value "M" delivered from the acceleration learning device 106b to perform a calculation as in the aforementioned equation (12), thereby deriving the setting angle $\theta_{set2}$.

Then, in step S3, the corrected sensitivity coefficient calculation portion 106f determines whether the aforementioned setting angles $\theta_{set1}$, $\theta_{set2}$ have a value within the predetermined allowable range.

One of the setting angles $\theta_{set1}$ and $\theta_{set2}$, which lies within the allowable range, is defined as a candidate used for determining the corrected sensitivity coefficient. Then, the process proceeds to step S4. When a user or the like has entered data IN on a setting angle in the case that the setting angles $\theta_{set1}$ and $\theta_{set2}$ do not lie within the allowable range, the setting angle entered by the user is defined as the candidate, and the process may then proceed to step S4. If the setting angles $\theta_{set1}$ and $\theta_{set2}$ do not lie within the allowable range, and no setting angle data IN is entered by the user or the like, the process proceeds to step S5 to take a predetermined standard setting angle as the candidate, and then proceeds to step S4.

In step S4, the aforementioned candidate setting angle is determined as a final setting angle.

Then, in step S6, the corrected sensitivity coefficient calculation portion 106f compares the middle learning value "M" delivered from the acceleration learning device 106b with a predetermined reference value to determine whether the middle learning value "M" has already converged.

Additionally, the corrected sensitivity coefficient calculation portion 106f examines the angle of inclination $\theta_{inc}$ delivered from the tilt angle calculation portion 106d to determine whether an appropriate angle of inclination $\theta_{inc}$ has been calculated. Since the angle of inclination $\theta_{inc}$ takes on a positive value when the vehicle is traveling along an uphill while taking on a negative value when the vehicle is traveling along a downhill, it is determined whether an appropriate angle of inclination $\theta_{inc}$ has been calculated, in consideration of the sign of the value.

If it is determined that an appropriate angle of inclination $\theta_{inc}$ has not been calculated, the process returns to step S1 to repeat the processing, without calculating the corrected sensitivity coefficient Kc.

On the other hand, if it is determined that that an appropriate angle of inclination $\theta_{inc}$ has been calculated, the process proceeds to step S7, where the corrected sensitivity coefficient calculation portion 106f applies the aforementioned final setting angle and the angle of inclination $\theta_{inc}$ delivered from the tilt angle calculation portion 106d to the aforementioned equation (9) to thereby derive the corrected sensitivity coefficient $K_c$, which is in turn supplied to the angular velocity conversion portion 104 via the switching portion 106e allowing it to calculate the actual angular velocity $\omega_y$ of the vehicle with high accuracy.

The process then proceeds to step S1 to repeat the processing.

As described above, according to the angular velocity detection device 100 of this example, the first and second setting angle calculation portions 106a, 106c calculate the setting angles $\theta_{set1}$, $\theta_{set2}$. The corrected sensitivity coefficient calculation portion 106f then determines whether the setting angles $\theta_{set1}$, $\theta_{set2}$ are appropriate, and thereafter calculates the corrected sensitivity coefficient $K_c$. Thus, it is possible to calculate the corrected sensitivity coefficient $K_c$ for determining the actual angular velocity $\omega_y$ of the vehicle with high accuracy.

It is also determined whether the angle of inclination $\theta_{inc}$ calculated in the tilt angle calculation portion 106d is suitable for calculating the actual angular velocity $\omega_y$ of the vehicle with high accuracy. If it is so, the corrected sensitivity coefficient $K_c$ is calculated. Thus, this makes it possible to calculate the actual angular velocity $\omega_y$ of the vehicle with high accuracy.

In this example, one of the setting angles $\theta_{set1}$, $\theta_{set2}$ calculated in the first and second setting angle calculation portions 106a, 106c is selected. However, a setting angle that can be obtained by averaging these setting angles $\theta_{set1}$, $\theta_{set2}$ may also be applied to the aforementioned equation (9) to calculate the corrected sensitivity coefficient $K_c$.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An angular velocity detection device, mounted in a mobile unit, for sensing an angular velocity of the mobile unit, the device comprising:
   angular velocity detection means for delivering a first sensor output corresponding to an angular velocity of the mobile unit;
   learning means for learning a sensitivity coefficient used to convert the first senor output to an actual angular velocity of the mobile unit in accordance with the first senor output and information carried by a GPS signal;
   acceleration detection means for delivering a second sensor output corresponding to an acceleration of the mobile unit;
   sensitivity coefficient correction means for determining a corrected sensitivity coefficient in accordance with the sensitivity coefficient and the second sensor output; and
   angular velocity conversion means for multiplying the first sensor output by the sensitivity coefficient from the learning means or the corrected sensitivity coefficient to thereby calculate the actual angular velocity of the mobile unit, wherein
   the sensitivity coefficient correction means calculates a setting angle of the angular velocity detection means relative to the mobile unit in accordance with a ratio between a sensitivity coefficient for converting a sensor output corresponding to an angular velocity sensed when a detection axis of the angular velocity detection means is oriented in a vertical direction into the actual angular velocity of the mobile unit and the sensitivity coefficient from the learning means,
   the sensitivity coefficient correction means calculates an angle of inclination of the mobile unit based on a ratio of the gravitational acceleration to a difference between the second sensor output and an actual acceleration of the mobile unit,
   the sensitivity coefficient correction means calculates a value obtained by multiplying a ratio between the setting angle and the angle of inclination by the sensitivity coefficient from the learning means as the corrected sensitivity coefficient, and
   the sensitivity coefficient correction means allows the angular velocity conversion means to calculate the actual angular velocity of the mobile unit using the corrected sensitivity coefficient.

2. An angular velocity detection device, mounted in a mobile unit, for sensing an angular velocity of the mobile unit, the device comprising:
   angular velocity detection means for delivering a first sensor output corresponding to an angular velocity of the mobile unit;
   learning means for learning a sensitivity coefficient used to convert the first senor output to an actual angular velocity of the mobile unit in accordance with the first senor output and information carried by a GPS signal;
   acceleration detection means for delivering a second sensor output corresponding to an acceleration of the mobile unit;
   sensitivity coefficient correction means for determining a corrected sensitivity coefficient in accordance with the second sensor output; and
   angular velocity conversion means for multiplying the first sensor output by the sensitivity coefficient from the learning means or the corrected sensitivity coefficient to thereby calculate the actual angular velocity of the mobile unit, wherein
   the sensitivity coefficient correction means learns the second sensor output to thereby determine a middle learning value from the acceleration detection means, and also calculates a setting angle of the angular velocity detection means relative to the mobile unit in accordance with a value obtained by multiplying the difference between the middle learning value and an under-horizontal middle learning value by the second sensor output divided by the gravitational acceleration, the under-horizontal middle learning value being obtained by learning a sensor output corresponding to an acceleration sensed when a detection axis of the acceleration detection means is oriented in a horizontal direction,
   the sensitivity coefficient correction means calculates an angle of inclination of the mobile unit based on a ratio of the gravitational acceleration to the difference between the second sensor output and an actual acceleration of the mobile unit, and also calculates a value obtained by multiplying a ratio between the setting angle and the angle of inclination by the sensitivity coefficient from the learning means as the corrected sensitivity coefficient, and
   the sensitivity coefficient correction means allows the angular velocity conversion means to calculate the actual angular velocity of the mobile unit using the corrected sensitivity coefficient.

3. An angular velocity detection device, mounted in a mobile unit, for sensing an angular velocity of the mobile unit, the device comprising:
   angular velocity detection means for delivering a first sensor output corresponding to an angular velocity of the mobile unit;
   learning means for learning a sensitivity coefficient used to convert the first senor output to an actual angular velocity of the mobile unit in accordance with the first senor output and information carried by a GPS signal;
   acceleration detection means for delivering a second sensor output corresponding to an acceleration of the mobile unit;
   sensitivity coefficient correction means for determining a corrected sensitivity coefficient in accordance with the sensitivity coefficient and the second sensor output; and
   angular velocity conversion means for multiplying the first sensor output by the sensitivity coefficient from the learning means or the corrected sensitivity coefficient to thereby calculate the actual angular velocity of the mobile unit, wherein
   the sensitivity coefficient correction means calculates a first setting angle of the angular velocity detection means relative to the mobile unit in accordance with a ratio between a sensitivity coefficient for converting a sensor output corresponding to an acceleration sensed when a detection axis of the angular velocity detection means is oriented in a vertical direction into the actual angular velocity of the mobile unit and the sensitivity coefficient from the learning means,
   the sensitivity coefficient correction means learns the second sensor output to thereby determine a middle learning value from the acceleration detection means, and also calculates a second setting angle of the angular velocity detection means relative to the mobile unit in accordance with a value obtained by multiplying a difference between the middle learning value and an under-horizontal middle learning value by the second sensor output divided by the gravitational acceleration, the under-horizontal middle learning value being obtained by learning a sensor output corresponding to an acceleration sensed when a detection axis of the acceleration detection means is oriented in a horizontal direction, the sensitivity coefficient correction means calculates an angle of inclination of the mobile unit based on a ratio of the gravitational acceleration to a difference between the second sensor output and an actual acceleration of the mobile unit, the sensitivity coefficient correction means selects one of the first and second setting angles in accordance with a predetermined condition to calculate, as the corrected sensitivity coefficient, a value obtained by multiplying a ratio between the selected setting angle and the angle of inclination by the sensitivity coefficient from the learning means, and the sensitivity coefficient correction means allows the angular velocity conversion means to calculate the actual angular velocity of the mobile unit using the corrected sensitivity coefficient.

4. An angular velocity detection device, mounted in a mobile unit, for sensing an angular velocity of the mobile unit, the device comprising:

an angular velocity detector for delivering a first sensor output corresponding to an angular velocity of the mobile unit;

a learning unit for learning a sensitivity coefficient used to convert the first senor output to an actual angular velocity of the mobile unit in accordance with the first senor output and information carried by a GPS signal;

an acceleration detector for delivering a second sensor output corresponding to an acceleration of the mobile unit;

a sensitivity coefficient correction unit for determining a corrected sensitivity coefficient in accordance with the sensitivity coefficient and the second sensor output; and an angular velocity converter for multiplying the first sensor output by the sensitivity coefficient from the learning unit or the corrected sensitivity coefficient to thereby calculate the actual angular velocity of the mobile unit, wherein the sensitivity coefficient correction unit calculates a setting angle of the angular velocity detector relative to the mobile unit in accordance with a ratio between a sensitivity coefficient for converting a sensor output corresponding to an angular velocity sensed when a detection axis of the angular velocity detector is oriented in a vertical direction into the actual angular velocity of the mobile unit and the sensitivity coefficient from the learning unit, the sensitivity coefficient correction unit calculates an angle of inclination of the mobile unit based on a ratio of the gravitational acceleration to a difference between the second sensor output and an actual acceleration of the mobile unit, the sensitivity coefficient correction unit calculates a value obtained by multiplying a ratio between the setting angle and the angle of inclination by the sensitivity coefficient from the learning unit as the corrected sensitivity coefficient, and the sensitivity coefficient correction unit allows the angular velocity converter to calculate the actual angular velocity of the mobile unit using the corrected sensitivity coefficient.

5. An angular velocity detection device, mounted in a mobile unit, for sensing an angular velocity of the mobile unit, the device comprising:

an angular velocity detector for delivering a first sensor output corresponding to an angular velocity of the mobile unit;

a learning unit for learning a sensitivity coefficient used to convert the first senor output to an actual angular velocity of the mobile unit in accordance with the first senor output and information carried by a GPS signal;

an acceleration detector for delivering a second sensor output corresponding to an acceleration of the mobile unit;

a sensitivity coefficient correction unit for determining a corrected sensitivity coefficient in accordance with the second sensor output; and an angular velocity converter for multiplying the first sensor output by the sensitivity coefficient from the learning unit or the corrected sensitivity coefficient to thereby calculate the actual angular velocity of the mobile unit, wherein the sensitivity coefficient correction unit learns the second sensor output to thereby determine a middle learning value from the acceleration detector, and also calculates a setting angle of the angular velocity detector relative to the mobile unit in accordance with a value obtained by multiplying the difference between the middle learning value and an under-horizontal middle learning value by the second sensor output divided by the gravitational acceleration, the under-horizontal middle learning value being obtained by learning a sensor output corresponding to an acceleration sensed when a detection axis of the acceleration detector is oriented in a horizontal direction, the sensitivity coefficient correction unit calculates an angle of inclination of the mobile unit based on a ratio of the gravitational acceleration to the difference between the second sensor output and an actual acceleration of the mobile unit, and also calculates a value obtained by multiplying a ratio between the setting angle and the angle of inclination by the sensitivity coefficient from the learning unit as the corrected sensitivity coefficient, and the sensitivity coefficient correction unit allows the angular velocity converter to calculate the actual angular velocity of the mobile unit using the corrected sensitivity coefficient.

6. An angular velocity detection device, mounted in a mobile unit, for sensing an angular velocity of the mobile unit, the device comprising:

an angular velocity detector for delivering a first sensor output corresponding to an angular velocity of the mobile unit;

a learning unit for learning a sensitivity coefficient used to convert the first senor output to an actual angular velocity of the mobile unit in accordance with the first senor output and information carried by a GPS signal;

an acceleration detector for delivering a second sensor output corresponding to an acceleration of the mobile unit;

a sensitivity coefficient correction unit for determining a corrected sensitivity coefficient in accordance with the sensitivity coefficient and the second sensor output; and an angular velocity converter for multiplying the first sensor output by the sensitivity coefficient from the learning unit or the corrected sensitivity coefficient to thereby calculate the actual angular velocity of the mobile unit, wherein the sensitivity coefficient correction unit calculates a first setting angle of the angular velocity detector relative to the mobile unit in accordance with a ratio between a sensitivity coefficient for converting a sensor output corresponding to an acceleration sensed when a detection axis of the angular velocity detector is oriented in a vertical direction into the actual angular velocity of the mobile unit and the sensitivity coefficient from the learning unit, the sensitivity coefficient correction unit learns the second sensor output to thereby determine a middle learning value from the acceleration detector, and also calculates a second setting angle of the angular velocity detector relative to the mobile unit in accordance with a value obtained by multiplying a difference between the middle learning value and an under-horizontal middle learning value by the second sensor output divided by the gravitational acceleration, the under-horizontal middle learning value being obtained by learning a sensor output corresponding to an acceleration sensed when a detection axis of the acceleration detector is oriented in a horizontal direction, the sensitivity coefficient correction unit calculates an angle of inclination of the mobile unit based on a ratio of the gravitational acceleration to a difference between the second sensor output and an actual acceleration of the mobile unit, the sensitivity coefficient correction unit selects one of the first and second setting angles in accordance with a predetermined condition to calculate, as the corrected sensitivity coefficient, a value obtained by multiplying a ratio between the selected setting angle and the angle of inclination by the sensitivity coefficient from the learning unit, and the sensitivity coefficient correction unit allows the angular velocity converter to calculate the actual angular velocity of the mobile unit using the corrected sensitivity coefficient.

* * * * *